United States Patent
Coleman, Sr.

(10) Patent No.: US 9,762,730 B2
(45) Date of Patent: Sep. 12, 2017

(54) 2FACE

(71) Applicant: Johnathan R. Coleman, Sr., Houston, TX (US)

(72) Inventor: Johnathan R. Coleman, Sr., Houston, TX (US)

( * ) Notice: Subject to any disclaimer, the term of this patent is extended or adjusted under 35 U.S.C. 154(b) by 96 days.

(21) Appl. No.: 14/817,410

(22) Filed: Aug. 4, 2015

(65) Prior Publication Data

US 2017/0041465 A1    Feb. 9, 2017

(51) Int. Cl.
| | |
|---|---|
| *H04M 1/00* | (2006.01) |
| *H04M 3/42* | (2006.01) |
| *H04M 1/725* | (2006.01) |
| *H04W 88/06* | (2009.01) |

(52) U.S. Cl.
CPC ... *H04M 3/42263* (2013.01); *H04M 1/72519* (2013.01); *H04W 88/06* (2013.01)

(58) Field of Classification Search
CPC ......... H04M 3/42263; H04M 1/72519; H04W 88/06
USPC ............................................ 455/552.1, 575.1
See application file for complete search history.

(56) References Cited

U.S. PATENT DOCUMENTS

| | | | | |
|---|---|---|---|---|
| 2007/0124792 | A1* | 5/2007 | Bennett ............... | H04M 1/0233 725/133 |
| 2012/0081398 | A1* | 4/2012 | Sirpal .................. | G06F 1/1616 345/649 |
| 2012/0262571 | A1* | 10/2012 | Wang .................. | H04N 5/2354 348/135 |
| 2012/0275089 | A1* | 11/2012 | Alameh .............. | H04M 1/0254 361/679.01 |

\* cited by examiner

*Primary Examiner* — Ayodeji Ayotunde
(74) *Attorney, Agent, or Firm* — Garrett James O'Sullivan; Timothy Marc Shropshire; Eric Brandon Lovell

(57) ABSTRACT

The disclosed herein is a portable cellular communication system comprised of: at least two portable cellular communication units, wherein said units include: at least one means to convert sound into an electrical signal for each unit; at least one means to convert an electrical signal into sound for each unit; at least one display means to display a user interface for each unit; at least one light source for each unit; at least one sensory unit for each unit; at least one means to converts an electrical audio signal into a corresponding sound for each unit; at least one SIM card tray for each unit; at least one means for each unit to attach said portable cellular communication unit simultaneously to multiple external resources; at least one power supply module; a plurality of camera for each unit; and a plurality of controls on each unit.

12 Claims, 1 Drawing Sheet

2FACE

CROSS REFERENCE TO RELATED APPLICATIONS

Not applicable.

FEDERALLY SPONSORED RESEARCH AND DEVELOPMENT

Not applicable.

MICROFICHE

Not applicable

BACKGROUND OF THE INVENTION (1) Field of the Invention

The present invention relates generally to mobile phones. More specifically, it relates to a device that has two mobile phones embedded in a single device.

(2) Background

Consumer demand and competition in the wireless communications industry has driven a rapid evolution in cellular phone technology. Analog mobiles that were introduced in the early 1980s are being replaced by digital technology, which offers enhanced quality, security, and efficient spectrum use.

Using PCS (personal communication services) devices as an example, service providers are now able to attract cellular customers by offering an expanded variety of services, such as voicemail, short message service, and personal call management (i.e., providing a single telephone number for a user's home, mobile, and office). Although it is desirable to offer these and other services to cellular customers, it is also desirable to minimize the effect of such services on the cost, size, and convenience of the mobile device.

A substantial number of handheld computing devices, such as cellular phones, tablets, and E-Readers, make use of a touch screen display to not only deliver display information to the user, but also to receive inputs from user interface commands. While touch screen displays may increase the configurability of the handheld device and provide a wide variety of user interface options, this flexibility typically comes at a price. The dual use of the touch screen to provide content and receive user commands, while flexible for the user, may obfuscate the display and cause visual clutter, thereby leading to user frustration and loss of productivity.

The small form factor of handheld computing devices requires a careful balancing between the displayed graphics and the area provided for receiving inputs. On the one hand, the small display constrains the display space, which may increase the difficulty of interpreting actions or results. On the other, a virtual keypad or other user interface scheme is superimposed on or positioned adjacent to an executing application, requiring the application to be squeezed into an even smaller portion of the display.

This balancing act is particularly difficult for single display touch screen devices. Single display touch screen devices are crippled by their limited screen space. When users are entering information into the device, through the single display, the ability to interpret information in the display can be severely hampered, particularly when a complex interaction between display and interface is required.

BRIEF SUMMARY OF THE INVENTION

Primarily, the invention is a portable cellular communication system. The system is comprised of at least two portable cellular communication units. Furthermore, the units are comprised of at least one means to convert sound into an electrical signal for each unit, at least one means to convert an electrical signal into sound for each unit, at least one display means to display a user interface for each unit, at least one light source for each unit, at least one sensory unit for each unit, at least one means to convert an electrical audio signal into a corresponding sound for each unit, at least one SIM card tray for each unit, at least one means for each unit to attach said portable cellular communication unit simultaneously to multiple external resources, at least one power supply module, a plurality of cameras for each unit, and a plurality of controls on each unit, at least one USB port for each unit.

In one embodiment of the portable cellular communication system, each unit is further comprised of a computer-readable medium that stores computer-executable instructions that, when executed by at least one processor, perform a method. The method includes receiving a call on a first portable cellular communication unit, displaying, on said display of the first portable cellular communication unit, a user interface that allows a user to answer the call, receiving input on the first portable cellular communication unit on the display to end the call or place a caller on hold, to answer a second caller, receiving a call on a second portable cellular communication unit, displaying, on the display of the second portable cellular communication unit, a user interface that allows a user to answer the call, and receiving input on the second portable cellular communication unit on the display to end said call.

In a preferred embodiment of the system, each of the portable cellular communication unit has:

a microphone to convert sound into an electrical signal for each unit, a receiver to convert an electrical signal into sound for each unit, a display that is touch sensitive and is gesture-control enabled to display a user interface for each unit, an LED flashlight that is manually or automatically activated to provide light, a speaker to convert an electrical audio signal into a corresponding sound for each unit, a dock connector and/or USB connector to attach said cellular communication unit to multiple external resources simultaneously, such as a computer, musk system, keyboards, mice, thumb drives, etc.

Furthermore, the system has a battery and a connecting circuitry to provide a power supply to each of the portable cellular communication unit, a primary camera, a secondary camera, and multiple gesture-controlled buttons and control buttons for controlling the unit, such as power, volume, etc.

The summary is provided to introduce a selection of concepts, in a simplified form, that are further described below in the detailed description. This summary is not intended to identify key features or essential features of the claimed subject matter, nor is it intended to be used as an aid in determining the scope of the claimed subject matter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. Also, it is to be understood that the phraseology and terminology employed herein are for the purpose of description, and should not be regarded as limiting.

These, together with other objectives of the invention and the various features of novelty that characterize the invention, are pointed out with particularity in the disclosure. For a better understanding of the invention, its operating advantages, and the specific objectives attained by its uses, reference should be had to the accompanying drawings and descriptive matter, in which there are illustrated preferred embodiments of the invention.

BRIEF DESCRIPTION OF THE DRAWINGS

The drawings constitute a part of this specification and include exemplary embodiments to the invention, which may be embodied in various forms. It is to be understood that, in some instances, various aspects of the invention may be shown exaggerated or enlarged to facilitate an understanding of the invention.

DETAILED DESCRIPTIONS OF THE INVENTION

Figure 4:
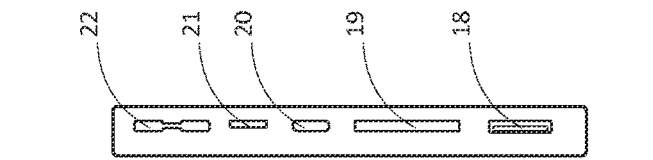
FIG. 4 illustrates the perspective right side view of the invention as a right side view of a primary portable cellular communication unit II.

The following is a detailed description of example embodiments of the invention that is depicted in the accompanying drawings. The example embodiments are in such detail as to clearly communicate the invention. However, the amount of detail that is offered is not intended to limit the anticipated variations of embodiments. On the contrary, the intention is to cover all modifications, equivalents, and alternatives falling within the spirit and scope of the present invention, as defined by the appended claims. The detailed descriptions below are designed to make such embodiments obvious to a person of ordinary skill in the art.

The present invention can be implemented on any communication device that has hardware components that can perform wireless and wired communication, such as (but not limited to)—multi-purpose pocket computers, personal multimedia devices, etc.

The various devices on which the applications that implement the present invention run may use one or more processors with different instruction-sets, architectures, clock-speeds, etc. and memory that may include high speed random access memory and may include non-volatile memory, such as one or more magnetic disk storage devices, flash memory devices, and other kinds of solid state memory devices.

The various applications that can implement the present invention run on electronic devices that may use at least one physical user interface device that provide the means of control and navigation within the operating system. Applications that run on the devices include (but are not limited to) touch-pads, such as those described in (but not limited to)—(1) U.S. patent application Ser. No. 10/722,948 ("Touch pad for handheld device") filed Nov. 25, 2003); (2) U.S. patent application Ser. No. 10/188,182 ("Touch pad for handheld device", filed Mar. 21, 2006); (3) U.S. patent application Ser. No 08/210,610 ("Computer system with touchpad support in operating system", filed Mar. 18, 1994); (4) U.S. patent application Ser. No. 643,256 ("Movable touch pad with added functionality", filed Ser. No. 10/643, 256), touch screens such as those described in (but not limited to) (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005 and (9) U.S. patent application Ser. No. 11/367,749, "Multi-Functional Hand-Held Device," filed on Mar. 3, 2006, click wheels, such as those described in U.S. patent application Ser. No. 11/549,619 "Method, device, and graphical user interface for dialing with a click wheel" filed on Oct. 13, 2006, keyboards, such as those mentioned in (but not limited to) U.S. patent application Ser. No. 07/711,760 ("Ergonomic keyboard input device", filed on Jun. 6, 1991), mouse, such as those described in (but not limited to) (1) application Ser. No. 09/167,314 ("Computer mouse with enhance control button (s)", filed on Oct. 6, 1998); (2) application Ser. No. 08/288, 945 ("Roller mouse for implementing scrolling in windows applications", filed on Aug. 10, 1994) and gesture recognition means, such as those described in (but not limited to) (1) European Patent application publication number: EP2482176 A2 ("Multi-input gesture control for a display screen", filed on Nov. 4, 2011) and (2) U.S. Patent application with publication number 20120317511 A1 ("DISPLAY WITH BUILT IN 3D SENSING CAPABILITY AND GESTURE CONTROL OF TV", filed on Aug. 21, 2012).

Display means used by these devices may use LCD (liquid crystal display) technology, LED (light Emitting Diode) technology, CRT (Cathode ray tube) technology, or LPD (light emitting polymer) technology, or any other display technologies. Various realizations of graphics display circuitry that implement a Graphics Processing Unit (GPU) are used to achieve video interface between user and these electronic devices.

Connectivity of these devices with networks, such as the Internet, an intranet and/or wireless network, such as cellular telephone network, a wired or wireless local area network (LAN) and/or metropolitan area network (MAN) and/or WAN (wide area network) and other wireless communication is achieved by use of a plurality of communication standards, protocols and technologies like Bluetooth, Wireless Fidelity (Wi-Fi) and/or any other suitable communication protocol, including communication protocols not yet developed as of the filing date of this document.

The present invention maybe implemented on applications that run on a single or variety of operating system platforms, including but not limited to OSX, WINDOWS, UNIX, IOS, ANDROID, SYMBIAN, LINUX, or embedded operating systems such as VxWorks.

The units of the present invention may use one or more processors with different instruction-sets, architectures, clock-speeds, etc. and memory that may include high speed random access memory and may include non-volatile memory, such as one or more magnetic disk storage devices, flash memory devices, and other kinds of solid state memory devices.

Figure 2:
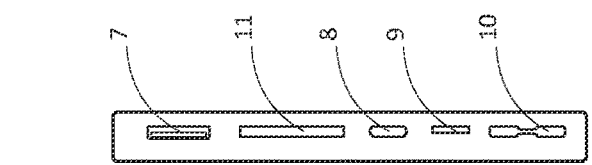
FIG. 2 illustrates the perspective left side view of the invention as a left side view of a primary portable cellular communication unit I.
Figure 1:
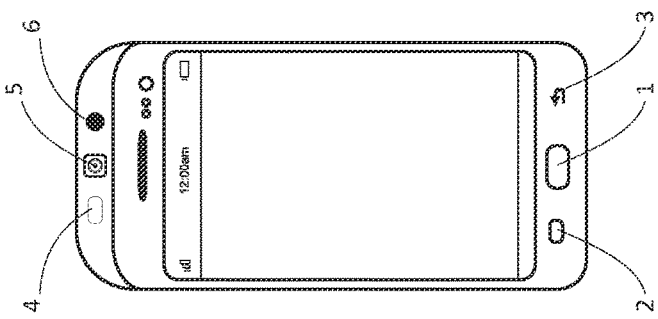
FIG. 1 illustrates the perspective front view of the invention as a primary portable cellular communication unit I.

Referring to the drawings, and specifically to FIG. 1-FIG. 2 thereof, depicts a pictorial representation of a primary portable cellular communication unit I that comprise the portable cellular communication system. The portable cellular communication unit I includes a control and navigation panel with keys, providing a convenient controlling and navigation in the communication unit of the communication system as home option 1, menu option 2, and back option 3, however the keys of the control and navigation panel is touch enabled, soft-keys, gesture-controlled or like; a light source 4 for providing flashlight that is manually or automatically activated to provide light, the light source is an LED; a plurality of camera, a primary camera 5 to enable s user to click pictures, a secondary camera which functions as a webcam and device for clicking pictures; a speaker system 6 capable of providing an audio output and further capable to input audio input, that enables a user to listen to the audio output and speak to the unit via the speaker system; a sensory unit system that is enabled to sense the touch of a user; a display system with a graphical user interface providing a means to operate the portable cellular communication unit, however the display system responds to the users touch, navigation and control commands sent using the control and navigation panel and the sensory unit; a USB port 7 to dock and connect an external storage device to the portable cellular communication unit I; a power control key 8 that control the flow of power in the portable cellular communication unit I; a SIM card docking port 9 to house and connect a SIM card to the portable cellular communication unit I to enable cellular connection; a volume control key 10 that enables to control volume of the portable cellular communication unit I and one power supply module 11 to power the secondary portable cellular communication unit I.

Figure 3:
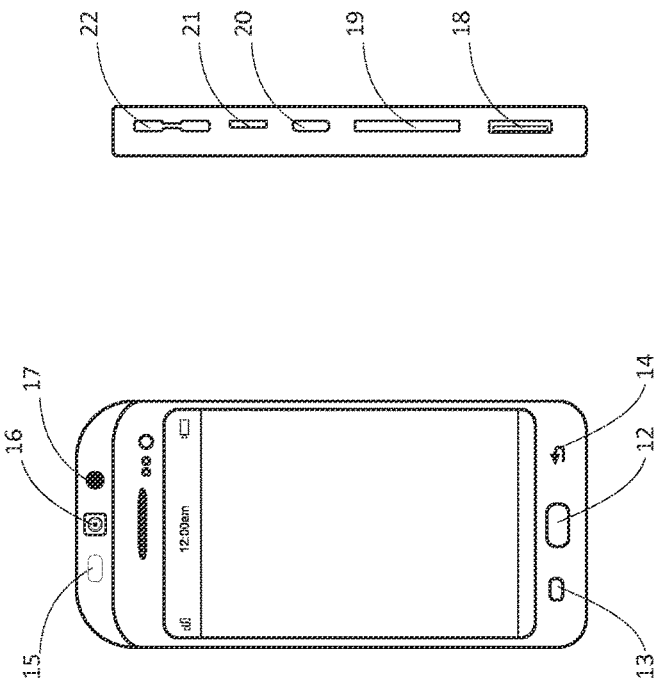
FIG. 3 illustrates the perspective rear view of the invention as a primary portable cellular communication unit II.

Referring to the drawings, and specifically to FIG. 3-FIG. 4, depicts a pictorial representation of a secondary portable cellular communication unit II that comprises the portable cellular communication system. The portable cellular communication unit II includes a control and navigation panel with keys, providing a convenient controlling and navigation in the communication unit II of the communication system of the communication system as home option 12, menu option 13, and back option 14, however the keys of the control and navigation panel is touch enabled, soft-keys, gesture-controlled or like; a light source 15 for providing flashlight that is manually or automatically activated to provide light, the light source is an LED; a plurality of camera, a primary camera 16 to enable s user to click pictures, a secondary camera which functions as a webcam and device for clicking pictures; a speaker system 17 capable of providing an audio output and further capable to input audio input, that enables a user to listen to the audio output and speak to the unit via the speaker system; a sensory unit system that is enabled to sense the touch of a user; a display system with a graphical user interface providing a means to operate the portable cellular communication unit II, however the display system responds to the users touch, navigation and control commands sent using the control and navigation panel and the sensory unit; a USB port 18 to dock and connect an external storage device to the portable cellular communication unit II; a power control key 19 that control the flow of power in the portable cellular communication unit II; a SIM card docking port 20 to house and connect a SIM card to the portable cellular communication unit II to enable cellular connection; a volume control key 21 that enables to control volume of the portable cellular communication unit II and one power supply module to power the secondary portable cellular communication unit II.

The invention is a portable cellular communication system. The system is comprised of at least two portable cellular communication units I and II. Furthermore, the units are comprised of at least one means to convert sound into an electrical signal for each unit, at least one means to convert an electrical signal into sound for each unit, at least one display means to display a user interface for each unit, at least one light source for each unit, at least one sensory unit for each unit, at least one means to convert an electrical audio signal into a corresponding sound for each unit, at least one SIM card tray for each unit, at least one means for each unit to attach said portable cellular communication unit simultaneously to multiple external resources, at least one power supply module, a plurality of cameras for each unit, and a plurality of controls on each unit, at least one USB port for each unit.

In one embodiment of the portable cellular communication system, each unit is further comprised of a computer-readable medium that stores computer-executable instructions that, when executed by at least one processor, perform a method. The method includes receiving a call on a first portable cellular communication unit I and II, displaying, on said display of the portable cellular communication unit I and II, a user interface that allows a user to answer the call, receiving input on the first portable cellular communication unit I on the display to end the call or place a caller on hold, to answer a second caller, receiving a call on a second portable cellular communication unit II, displaying, on the display of the second portable cellular communication unit II, a user interface that allows a user to answer the call, and receiving input on the second portable cellular communication unit II on the display to end said call.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

Although the invention has been explained in relation to its preferred embodiment, it is to be understood that many other possible modifications and variations can be made without departing from the spirit and scope of the invention.

I claim:
1. A portable cellular communication system comprising:
   a. a singular housing having a first side and a second side separated by at least a first sidewall and a second sidewall;
   b. a first communication unit comprising:
      i. a first speaker;
      i. a first display, wherein the first display is a user interface for the first communication unit;
      ii. a first light source;
      iii. a first sensory input unit;
      i. a first SIM card tray;

ii. at least one port to electrically attach the first communication unit to one or more external resources; and
iii. a first camera;
f. a second communication unit comprising:
i. a second speaker;
ii. a second display, wherein the first display is a user interface for the second communication unit;
iii. a second light source;
iv. a second sensory input unit;
v. a second SIM card tray;
vi. at least one port to electrically attach the second communication unit to one or more external resources; and
vii. a second camera,
g. wherein the first communication unit and the second communication unit are disposed within the housing, wherein the first display is disposed on an external surface of the first side, wherein the second display is disposed on an external surface of the second side, and wherein the first side and second side are opposite one another relative to the housing, and wherein at least one power supply module is electrically connected to the first communication unit and the second communication unit.

2. The system of claim 1, further comprising a first microphone and a second microphone.

3. The system of claim 1, wherein the first display receives input to control the first communication.

4. The system of claim 1, wherein the first display and the second display are each touch sensitive.

5. The system of claim 1, wherein the first display and the second display are each gesture controlled.

6. The system of claim 1, wherein the first light source and the second light source are each comprised of a led flash light.

7. The system of claim 6, wherein the first light source and the second light source are each activated automatically.

8. The system of claim 1, further comprising a dock connector configured to connect the housing to one or more external devices.

9. The system of claim 1, wherein the at least port of the second communication unit and the at least one port of the first communication unit each comprise at least a USB port, wherein the second SIM card tray and the at least one port of the second communication unit are disposed on the second sidewall, and wherein the first SIM card tray and the at least one port of the first communication unit are disposed on the first sidewall.

10. The system of claim 1, wherein the first camera and the second camera each comprise a primary camera and a secondary camera, wherein the first camera is disposed on the external surface of the first side, and wherein the second camera is disposed on the external surface of the second side.

11. The system of claim 1, further comprising a plurality of control buttons configured to control operation of the system.

12. The system of claim 1, wherein each of the first communication unit and the second communication unit further comprise computer-readable medium that stores computer-executable instructions that, when executed by at least one processor, perform a method comprising the steps of:
a. receiving a first call on the first communication unit;
b. displaying, on the first display, a user interface that allows a user to answer the first call;
c. receiving input on the first communication unit from the first display to end the first call;
d. receiving a second call on the second communication unit;
e. displaying, on the second display, a user interface that allows the second user to answer the second call; and
f. receiving input on the second communication unit on the second display to end the second call.

* * * * *